(12) United States Patent
Zhang et al.

(10) Patent No.: US 12,211,305 B2
(45) Date of Patent: Jan. 28, 2025

(54) DATA-EFFICIENT OBJECT DETECTION OF ENGINEERING SCHEMATIC SYMBOLS

(71) Applicant: C3.ai, Inc., Redwood City, CA (US)

(72) Inventors: Zhaoxi Zhang, Palo Alto, CA (US);
Amir H. Delgoshaie, Redwood City, CA (US); Chih-Hsu Lin, Belmont, CA (US); Shouvik Mani, New York City, NY (US)

(73) Assignee: C3.ai, Inc., Redwood City, CA (US)

( * ) Notice: Subject to any disclaimer, the term of this patent is extended or adjusted under 35 U.S.C. 154(b) by 385 days.

(21) Appl. No.: 17/699,034

(22) Filed: Mar. 18, 2022

(65) Prior Publication Data

US 2023/0298376 A1    Sep. 21, 2023

(51) Int. Cl.
| | |
|---|---|
| *G06V 30/422* | (2022.01) |
| *G06V 10/82* | (2022.01) |
| *G06V 30/412* | (2022.01) |
| *G06V 30/413* | (2022.01) |
| *G06V 30/414* | (2022.01) |

(52) U.S. Cl.
CPC ............ *G06V 30/422* (2022.01); *G06V 10/82* (2022.01); *G06V 30/412* (2022.01); *G06V 30/413* (2022.01); *G06V 30/414* (2022.01)

(58) Field of Classification Search
None
See application file for complete search history.

(56) References Cited

U.S. PATENT DOCUMENTS

2021/0319327 A1*  10/2021  Poirier ............ G06V 30/18057
2021/0383037 A1*  12/2021  Segev .................... G06F 30/27

FOREIGN PATENT DOCUMENTS

| CA | 3044461 A1 | 5/2020 |
| WO | 2021050787 A1 | 3/2021 |

OTHER PUBLICATIONS

International Search Report and Written Opinion of the International Searching Authority dated Jun. 7, 2023 in connection with International Patent Application No. PCT/US2023/063509, 8 pages.
International Search Report and Written Opinion of the International Searching Authority dated Jun. 7, 2023 in connection with International Patent Application No. PCT/US2023/063506, 8 pages.
Mani et al., "Automatic Digitization of Engineering Diagrams using Deep Learning and Graph Search," 2020 IEEE/CVF Conference on Computer Vision and Pattern Recognition Workshops (CVPRW), Jun. 2020, 7 pages.

(Continued)

*Primary Examiner* — Andrew H Lam (57) ABSTRACT

A method includes obtaining an engineering schematic containing multiple symbols and connections involving the symbols, where different ones of the symbols in the engineering schematic represent different types of equipment. The method also includes identifying visual features of the engineering schematic. The method further includes processing the visual features using at least one trained machine learning model to (i) identify boundaries around the symbols in the engineering schematic and (ii) classify the symbols in the engineering schematic into multiple classifications, where different ones of the classifications are associated with different types of symbols.

21 Claims, 8 Drawing Sheets

(56) References Cited

OTHER PUBLICATIONS

OpenShift, "Parsing Engineering Diagrams for Industrial AI Applications using Deep Learning and Graph Search," Transcript of YouTube video (https://www.youtube.com/watchv=eGvwlk8EIAM), Open Data Science Conference (ODSC) Europe 2021, Jun. 2021, 18 pages.

Mani et al., "Parsing Engineering Diagrams for Industrial AI Applications using Deep Learning and Graph Search," c3.ai, NVIDIA GTC 2021, Apr. 2021, 26 pages.

Girshick, "Fast R-CNN," Computer Vision and Pattern Recognition, arXiv:1504.08083v2, Sep. 2015, 9 pages.

Ghiasi et al., "Simple Copy-Paste is a Strong Data Augmentation Method for Instance Segmentation," Computer Vision and Pattern Recognition, arXiv:2012.07177v2, Jun. 2021, 13 pages.

Lin et al., "Feature Pyramid Networks for Object Detection," Computer Vision and Pattern Recognition, arXiv:1612.03144, Apr. 2017, 9 pages.

Wikipedia, "Piping and instrumentation diagram," Jan. 2022, 4 pages.

Gandhi, "R-CNN, Fast R-CNN, Faster R-CNN, YOLO—Object Detection Algorithms," Towards Data Science, Jul. 2018, 8 pages.

Moreno-García et al.,"New trends on digitisation of complex engineering drawings," Neural Comput. & Applic. 31, Jun. 2018, 70 pages.

Van Daele et al., "An Automated Engineering Assistant: Learning Parsers for Technical Drawings," Artificial Intelligence (cs.AI), arXiv:1909.08552v1, Sep. 2019, 23 pages.

International Search Report and Written Opinion of the International Searching Authority in connection with International Patent Application No. PCT/US2020/050271 issued Dec. 16, 2020, 5 pages.

\* cited by examiner

DATA-EFFICIENT OBJECT DETECTION OF ENGINEERING SCHEMATIC SYMBOLS

TECHNICAL FIELD

This disclosure is generally directed to machine learning systems. More specifically, this disclosure is directed to data-efficient object detection of engineering schematic symbols.

BACKGROUND

Engineering diagrams typically contain many symbols, which may represent sensors or other pieces of equipment in a manufacturing facility or other facility or location. The engineering diagrams also typically contain various connections between the symbols, which may represent material flows or other relationships between the equipment at the location. In some instances, the symbols and the connections between the symbols in engineering diagrams are needed in order to identify and understand complex relationships among the equipment. However, this process is often achieved using manual effort, which can be time-consuming, expensive, and inaccurate. Automated approaches for performing this process typically require a large number of annotated engineering diagrams, which may not be available and which may therefore prevent the use of these automated approaches.

SUMMARY

This disclosure relates to data-efficient object detection of engineering schematic symbols.

In a first embodiment, a method includes obtaining an engineering schematic containing multiple symbols and connections involving the symbols, where different ones of the symbols in the engineering schematic represent different types of equipment. The method also includes identifying visual features of the engineering schematic. The method further includes processing the visual features using at least one trained machine learning model to (i) identify boundaries around the symbols in the engineering schematic and (ii) classify the symbols in the engineering schematic into multiple classifications, where different ones of the classifications are associated with different types of symbols.

In a second embodiment, an apparatus includes at least one processing device configured to obtain an engineering schematic containing multiple symbols and connections involving the symbols, where different ones of the symbols in the engineering schematic represent different types of equipment. The at least one processing device is also configured to identify visual features of the engineering schematic. The at least one processing device is further configured to process the visual features using at least one trained machine learning model to (i) identify boundaries around the symbols in the engineering schematic and (ii) classify the symbols in the engineering schematic into multiple classifications, where different ones of the classifications are associated with different types of symbols.

In a third embodiment, a non-transitory computer readable medium stores computer readable program code that when executed causes one or more processors to obtain an engineering schematic containing multiple symbols and connections involving the symbols, where different ones of the symbols in the engineering schematic represent different types of equipment. The medium also stores computer readable program code that when executed causes the one or more processors to identify visual features of the engineering schematic. The medium further stores computer readable program code that when executed causes the one or more processors to process the visual features using at least one trained machine learning model to (i) identify boundaries around the symbols in the engineering schematic and (ii) classify the symbols in the engineering schematic into multiple classifications, where different ones of the classifications are associated with different types of symbols.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 10, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, engineering diagrams typically contain many symbols, which may represent sensors or other pieces of equipment in a manufacturing facility or other facility or location. The engineering diagrams also typically contain various connections between the symbols, which may represent material flows or other relationships between the equipment at the location. In some instances, the symbols and the connections between the symbols in engineering diagrams are needed in order to identify and understand complex relationships among the equipment. However, this process is often achieved using manual effort, which can be time-consuming, expensive, and inaccurate. Automated approaches for performing this process typically require a large number of annotated engineering diagrams, which may not be available and which may therefore prevent the use of these automated approaches.

Electronic parsing of engineering diagrams generally involves generating digital representations of engineering systems based on non-digital engineering schematics (also known as engineering diagrams). Diagram parsing generally uses one or more computer vision models to detect target symbols in the engineering diagrams, determine connections among the detected symbols, and output digitized representations of the engineering diagrams in a structured format (such as by using structured data).

This disclosure provides various techniques for data-efficient object detection of symbols in engineering schematics and various techniques for training data augmentation related to engineering schematics. The techniques for data-efficient object detection are based on the use of one or more machine learning models that can be trained to recognize symbols in engineering schematics and optionally to recognize connections among the recognized symbols. The one or more machine learning models can be trained using various information, such as training diagrams developed from one or more domain-specific engineering symbol libraries or other training data collected or generated in any suitable manner. The techniques for data-efficient object detection can therefore be used to perform efficient and accurate symbol detection using engineering schematics, which can result in more-accurate digital representations of the engineering schematics. Moreover, the techniques for data-efficient object detection can provide improved model efficiencies, meaning these techniques can take less time to perform symbol identification.

The techniques for training data augmentation support the use of one or more mechanisms that can be used to augment training data related to engineering schematics. For example, the techniques for training data augmentation can perform resizing of one or more labeled engineering schematics using random scales and random cropping and modification of the resized labeled engineering schematic(s) to create at least one synthetic diagram. The techniques for training data augmentation can also or alternatively include cropping one or more target symbols and randomly placing them into one or more engineering diagram backgrounds to create at least one synthetic diagram. The techniques for training data augmentation can also or alternatively include randomly selecting and optionally adding text onto one or more symbols from at least one symbol library and randomly placing them into one or more engineering diagram backgrounds to create at least one synthetic diagram. One, some, or all of these approaches can be used to produce additional labeled training data, which can be used to train one or more machine learning models. These techniques can therefore be used to simplify the collection or generation of training data used to train machine learning models, which can reduce the time and expense associated with the machine learning model training.

Note that both (i) techniques for data-efficient object detection and (ii) techniques for training data augmentation are described here as being performed using the same device(s) or system(s). As a result, one or more techniques for training data augmentation may be used to generate training data, where that training data is used to train one or more machine learning models so that the trained machine learning model(s) can be used to perform data-efficient object detection. However, it is possible for these techniques to be used separately. Thus, the techniques for data-efficient object detection can be used without training data augmentation, and the techniques for training data augmentation can be used without data-efficient object detection. Also note that even if both techniques are used together, the techniques need not be performed using the same device(s) or system(s) and can be implemented together or separately as needed or desired.

Figure 1:
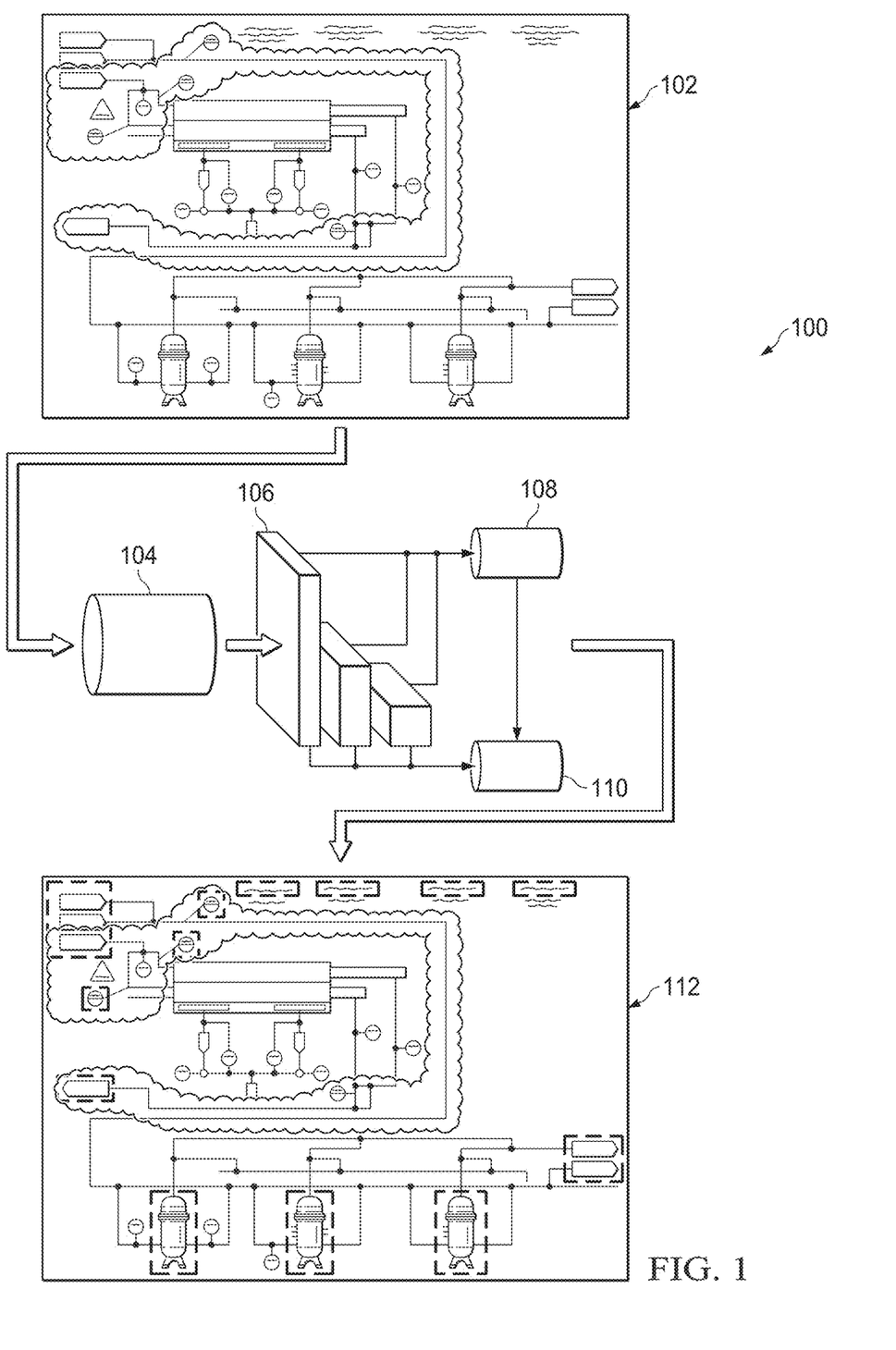
FIG. 1 illustrates an example architecture for data-efficient object detection of engineering schematic symbols according to this disclosure.

FIG. 1 illustrates an example architecture 100 for data-efficient object detection of engineering schematic symbols according to this disclosure. As shown in FIG. 1, the architecture 100 generally operates to receive and process at least one input engineering schematic 102. Each input engineering schematic 102 generally includes a number of symbols representing sensors or other pieces of equipment and a number of connections to, from, and between the symbols. Each input engineering schematic 102 may also include notations or other markings, such as markings around one or more particular portions of the input engineering schematic 102 each containing related equipment. Each input engineering schematic 102 may be obtained from any suitable source, such as a camera, scanner, database, user device, or other source of input engineering schematics.

The input engineering schematic 102 here is provided to a feature extractor 104, which generally operates to extract visual features of the input engineering schematic 102. The feature extractor 104 may use any suitable technique to identify visual features of the input engineering schematic 102. For example, the feature extractor 104 may represent a trained machine learning model, such as a convolution neural network (CNN) or other type of machine learning model, that is trained to process input engineering schematics 102 using various convolution, pooling, or other layers in order to generate feature vectors or other extracted visual features based on the input engineering schematic 102. As particular examples, the feature extractor 104 may represent an implementation of the VGG or EfficientNet feature extractor.

The extracted visual features are provided to a feature pyramid network 106, which processes the extracted visual features in order to generate feature maps associated with the features of the input engineering schematic 102. Different ones of the feature maps generated by the feature pyramid network 106 may include features of the input engineering schematic 102 at different scales. This allows the architecture 100 to subsequently identify symbols in the input engineering schematic 102 having varying sizes, such as by identifying symbols having significantly different sizes. The feature pyramid network 106 may use any suitable technique to analyze visual features and generate feature maps at different scales. For instance, the feature pyramid network 106 may represent a trained machine learning model, such as a CNN or other type of machine learning model, that is trained to process feature vectors or other extracted visual features and generate feature maps at different scales.

The feature maps at different scales are provided to a region proposal network 108 and a region of interest network 110. The region proposal network 108 generally operates to identify potential symbols in the input engineering schematic 102 and to identify bounding boxes or other possible boundaries around the potential symbols in the input engineering schematic 102 using the feature maps. For example, the region proposal network 108 may use different specialized symbol prediction heads or other logic to generate class-agnostic bounding boxes around potential symbols in the input engineering schematic 102. The bounding boxes are referred to as "class-agnostic" here since the bounding boxes can be generated without reference to the specific types of symbols contained in the input engineering schematic 102. The region proposal network 108 may use any suitable technique to identify potential symbols and boundaries around the potential symbols in the input engineering schematic 102. For instance, the region proposal network 108 may represent a trained machine learning model, such as a CNN or other type of machine learning model, that is trained to process feature maps and identify potential symbols and boundaries around the potential symbols.

The region of interest network 110 generally operates to process the feature maps at different scales and the boundaries of the potential symbols in the input engineering schematic 102 in order to identify actual symbols in the input engineering schematic 102 and to classify those symbols. For example, the region of interest network 110 may use machine learning to classify each of the potential symbols into different classes, where the different classes are associated with different types of engineering symbols (such as different classes of symbols representing sensors, vessels, valves, actuators, or other components). The region of interest network 110 may use any suitable technique to identify and classify symbols in the input engineering schematic 102. For instance, the region of interest network 110 may represent a trained machine learning model, such as a CNN or other type of machine learning model with region of interest pooling, that is trained to process feature maps and symbol boundaries in order to identify and classify different symbols.

In this way, the architecture 100 generally supports a multi-stage approach for symbol detection, which includes (i) identification of class-agnostic boundaries for potential symbols and (ii) identification and classification of actual symbols based on the identified boundaries. Through suitable training of the machine learning model(s) used in the architecture 100, the architecture 100 can be used to effectively and accurate identify engineering symbols in schematics. This can be done much more quickly and accurately compared to manual approaches, and this can be done without requiring a large number of annotated engineering diagrams. The identified engineering symbols may be used in any suitable manner, such as to create a digital representation of an engineering schematic (which can itself be used in any suitable manner).

Note that the functions shown in or described with respect to FIG. 1 can be implemented in an electronic device, such as a computing device, in any suitable manner. For example, in some embodiments, at least some of the functions shown in or described with respect to FIG. 1 can be implemented or supported using one or more software applications or other software instructions that are executed by one or more processing devices of a desktop computer, laptop computer, tablet computer, server computer, or other device. In other embodiments, at least some of the functions shown in or described with respect to FIG. 1 can be implemented or supported using dedicated hardware components. In general, the functions shown in or described with respect to FIG. 1 can be performed using any suitable hardware or any suitable combination of hardware and software/firmware instructions.

Although FIG. 1 illustrates one example of an architecture 100 for data-efficient object detection of engineering schematic symbols, various changes may be made to FIG. 1. For example, while various functions shown in or described with respect to FIG. 1 are described as being implemented or performed using machine learning models, any number of machine learning models may be used to implement the architecture 100. In some cases, different machine learning models can be trained to perform different functions of the architecture 100. In other cases, a single machine learning model can be trained to perform multiple functions of the architecture 100. Also, components can be added, omitted, combined, further subdivided, replicated, or placed in any other suitable configuration in the architecture 100 according to particular needs.

Figure 2:
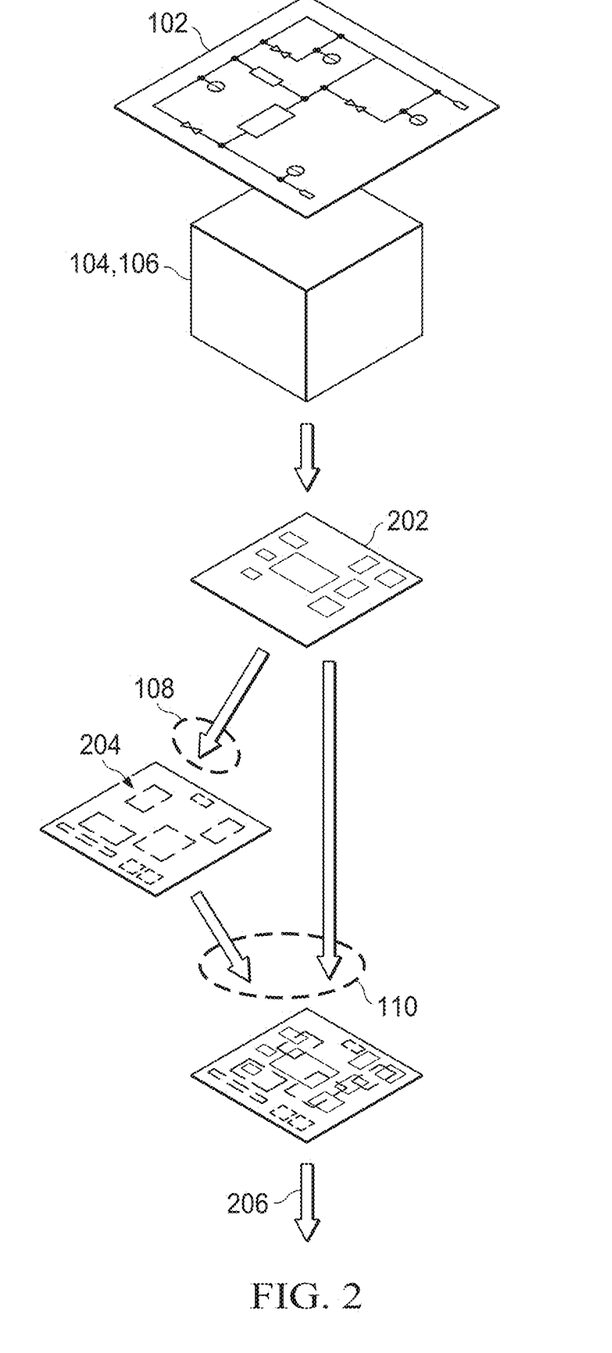
FIG. 2 illustrates example data processing within the architecture of FIG. 1 according to this disclosure.

FIG. 2 illustrates example data processing within the architecture 100 of FIG. 1 according to this disclosure. As shown in FIG. 2, an input engineering schematic 102 is processed using the feature extractor 104 and the feature pyramid network 106, which leads to the generation of various extracted feature maps 202 (one example of which is shown here). The feature maps 202 can include low-level and high-level visual features of the input engineering schematic 102 or otherwise identify visual features of the input engineering schematic 102 at different scales. The region proposal network 108 processes the feature maps 202 in order to identify one or more potential symbols in the input engineering schematic 102 and a boundary 204 (such as a box or other polygon) around each potential symbol in the input engineering schematic 102. In some cases, the region proposal network 108 can perform bounding box regression in order to identify the boundaries 204 of the potential symbols in the input engineering schematic 102.

The region of interest network 110 processes the feature maps 202 and the boundaries 204 of the potential symbols in order to identify actual symbols in the input engineering schematic 102 and generate classifications 206 of the actual symbols in the input engineering schematic 102. For example, the region of interest network 110 may generate a classification 206 for each identified boundary 204, where the classification 206 identifies the type of symbol contained within the identified boundary 204 (or no type of symbol if the region of interest network 110 determines that no actual symbol is contained in the identified boundary 204). Each classification 206 can therefore identify the type of one of the symbols detected in the input engineering schematic 102. In some cases, the region of interest network 110 can identify classification targets for the symbols in the input engineering schematic 102, where the classification targets represent specific types of symbols expected in a given domain or other application.

Engineering symbols are two-dimensional objects that have properties different from three-dimensional objects (such as people, animals, or vehicles) in terms of visual features. Unlike object detection in three-dimensional space where a machine learning model needs to learn effective feature extraction for various view angles and across different distances, a two-dimensional object detection model may only need to learn effective feature extraction for limited scaling and limited shifting of two-dimensional objects. Moreover, in many cases, engineering diagrams need to follow domain-specific standard symbol templates, meaning the variabilities of the engineering symbols across different engineering schematics tend to be lower compared to generic three-dimensional objects. In order to exploit the two-dimensional intrinsic characteristics of engineering symbols and the low variabilities of the engineering symbols, scale-specific prediction heads or other types of parallel prediction heads can be used in the region proposal network 108 as described in more detail below in order to improve model prediction quality. Also, training data augmentation based on operations such as random "copy and paste" data augmentation can be used as described in more detail below in order to improve data efficiency for training of the region proposal network 108.

In some embodiments, the region proposal network 108 and the region of interest network 110 can be trained to jointly optimize their model gradients and weights using a regression loss (related to generation of the boundaries 204) and a classification loss (related to generation of the classifications 206). As a particular example, the region proposal network 108 and the region of interest network 110 may be trained to minimize the following loss function, which combines the regression loss (on the right side of the sum) and the classification loss (on the left side of the sum):

$$L(\{p_i\}, \{t_i\}) = \frac{1}{N_{cls}} \sum_i L_{cls}(p_i, p_i^*) + \lambda \frac{1}{N_{reg}} \sum_i p_i^* L_{reg}(t_i, t_i^*)$$

Any suitable technique may be used for training one or more machine learning models to implement the functionality of one or more components of the architecture 100. For example, training data containing engineering schematics associated with known boundaries 204 and known classifications 206 may be used to train the region proposal network 108 and the region of interest network 110. In some embodiments, techniques such as back-propagation may be used to adjust model gradients and weights of one or more machine learning models until the one or more machine learning models accurately identify the known boundaries 204 and the known classifications 206 of the engineering schematics in the training data to a desired degree. In particular embodiments, the training may continue until the loss value (which may be calculated using the equation above or in any other suitable manner) is below a specific threshold value or until some other criterion or criteria have been satisfied (such as a specified amount of training time elapsing or a specified number of training iterations occurring).

Although FIG. 2 illustrates one example of data processing within the architecture 100 of FIG. 1, various changes may be made to FIG. 2. For example, the specific feature maps 202, boundaries 204, and classifications 206 will vary based on the specific input engineering schematics 102 being processed by the architecture 100.

Figure 3:
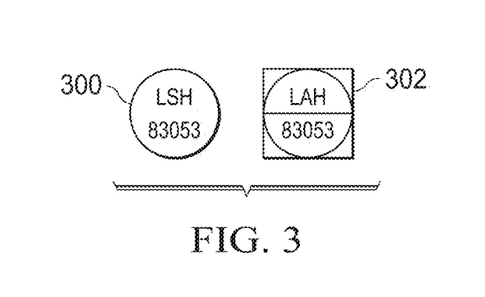
FIG. 3 illustrates example shapes and aspect ratios of engineering schematic symbols that may be detected using the architecture of FIG. 1 according to this disclosure.

For effective feature extraction of a three-dimensional object to be performed, a machine learning model often needs to be trained to identify features of the three-dimensional object regardless of the distance from a camera to the three-dimensional object. That is, whether the three-dimensional object is closer to or farther from the camera, a machine learning model should be able to effectively identify the features of the three-dimensional object. However, during engineering symbol detection, each engineering symbol may typically be represented within a limited range of shapes and aspect ratios. An example of this is shown in FIG. 3, which illustrates example shapes and aspect ratios of engineering schematic symbols 300 and 302 that may be detected using the architecture 100 of FIG. 1 according to this disclosure. As shown in FIG. 3, the symbol 300 is formed using a circle, and text may optionally be present within the circle. Also, the symbol 302 is formed using a circle within a square, and text may optionally be present within the square and circle. These two types of symbols 300 and 302 may typically have an aspect ratio of 1:1. Note that other symbols typically have other shapes (such as lines, ovals, triangles, diamonds, or other regular or irregular shapes) or combinations of shapes and/or other aspect ratios (such as taller aspect ratios or wider aspect ratios).

Figure 4:
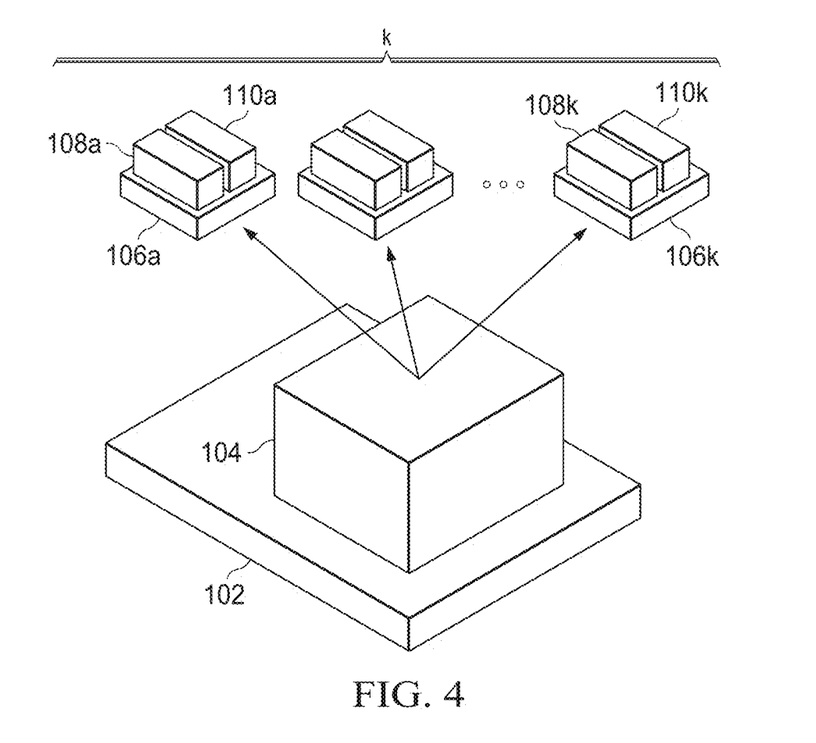
FIG. 4 illustrates example machine learning pathways for different types of engineering schematic symbols within the architecture of FIG. 1 according to this disclosure.

Based on the knowledge that each engineering symbol may typically have a known or predefined shape and aspect ratio, it is possible to create and train separate pathways in the architecture 100, where different pathways are used to predict the boundaries 204 and classifications 206 for different engineering symbols having different shapes and/or aspect ratios. FIG. 4 illustrates example machine learning pathways for different types of engineering schematic symbols within the architecture 100 of FIG. 1 according to this disclosure. As shown in FIG. 4, the feature extractor 104 can extract visual features from an input engineering schematic 102, and k different pathways can be used to process the extracted visual features in order to identify the boundaries and classifications for different types of symbols that might be contained in the input engineering schematic 102 (such as symbols having different shapes and/or aspect ratios). For example, different portions 106a-106k of the feature pyramid network 106, different portions 108a-108k of the region proposal network 108, and different portions 110a-110k of the region of interest network 110 may be trained or otherwise used differently in order to process different types of symbols. In some cases, the different portions 110a-110k of the region of interest network 110 may be trained to recognize different symbols, and each portion 110a-110k of the region of interest network 110 may be configured to output a true or false indicator identifying whether an identified symbol in the input engineering schematic 102 is or is not the specific symbol associated with that portion 110a-110k of the region of interest network 110.

This approach allows various pathways to learn effective features that are specific to different types of symbols, such as symbols having different shapes and/or aspect ratios. As a result, different pathways can be trained to effectively identify different types of symbols. Moreover, this approach isolates gradient and weight updates along each pathway so that different pathways can be trained separately or independently from one another. Because of this, while training the architecture 100, different symbols in the training data may be used to update the gradients and weights only along the pathways associated with those specific types of symbols. Pathways associated with other types of symbols may not need to be updated, which can simplify and speed up the training process. In addition, when specific types of symbols have low-quality annotations in the training data, the negative effects associated with the lack of quality training data for those specific types of symbols may be limited to their specific pathways, while other pathways associated with symbols having higher-quality annotations in the training data may not be affected.

Although FIG. 3 illustrates one example of shapes and aspect ratios of engineering schematic symbols 300 and 302 that may be detected using the architecture 100 of FIG. 1, various changes may be made to FIG. 3. For example, other engineering schematic symbols can have any other suitable shapes and/or any other suitable aspect ratios. Although FIG. 4 illustrates one example of machine learning pathways for different types of engineering schematic symbols within the architecture 100 of FIG. 1, various changes may be made to FIG. 4. For instance, the architecture 100 may support any desired number of parallel pathways in order to identify any desired number of engineering schematic symbol types.

Training a complex deep learning model or other machine learning model typically requires a large amount of labeled training data. To support the training of one or more machine learning models related to engineering symbols (such as the machine learning model or models used in the architecture 100 or other machine learning models used for other functions related to engineering symbols or schematics), the low variabilities of engineering symbols across diagrams (at least within a given domain, such as a given industry) can be exploited to implement various effective data augmentation approaches. These data augmentation approaches can be used to reduce the number of annotated training diagrams needed to train one or more machine learning models by a significant amount. The following describes three example data augmentation approaches that may be used to generate training data.

Figure 5:
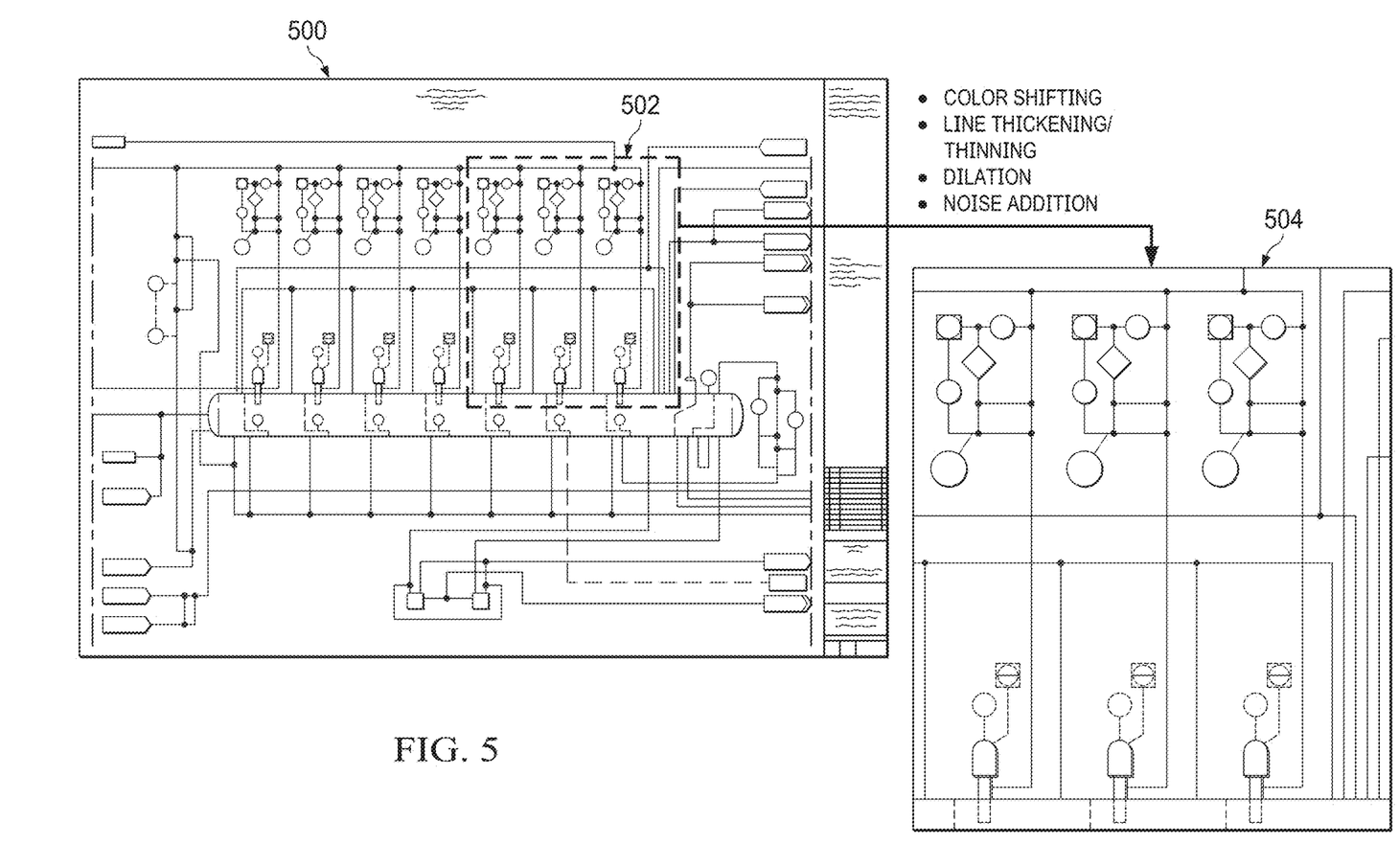
FIG. 5 illustrates a first example technique for training data augmentation according to this disclosure.

FIG. 5 illustrates a first example technique for training data augmentation according to this disclosure. This example technique involves resizing one or more labeled engineering schematics using at least one random scale and performing random cropping and modification of the resized labeled engineering schematic(s) to create at least one synthetic diagram. As shown in FIG. 5, for instance, a labeled engineering schematic 500 represents annotated training data, such as when the labeled engineering schematic 500 contains symbols having known boundaries 204 and known classifications 206. The first example technique for training data augmentation can resize the labeled engineering schematic 500 using one or more random scales (such as a larger or smaller scale), and the resized engineering schematic can be cropped to include only a specific region 502. Also, one or more modifications can be applied to the cropped region 502, such as by applying color shifting, line thickening/thinning, dilation, and/or noise pixel additions to the cropped region 502. This results in a new labeled engineering schematic 504, which represents a modified and rescaled portion of the labeled engineering schematic 500. Because the new schematic 504 is generated using the contents of the labeled engineering schematic 500, the new schematic 504 represents completely-labeled training data that can be used for machine learning model training. For instance, the new schematic 504 can contain known symbols with known boundaries 204 and known classifications 206.

Note that any number of resizing scales may be applied to each labeled engineering schematic 500 and that any number of overlapping and/or non-overlapping regions 502 may be defined for each rescaled version of each engineering schematic 500. Also note that each region 502 for each rescaled version of each engineering schematic 500 may be used to generate any number of new schematics 504, such as when different modification types or combinations of modification types are applied to each region 502 or when different levels of modifications are applied to each region 502. As a result, it is possible to generate a very large amount of annotated training data based on a limited number of labeled engineering schematics 500. In addition, note that when one or more machine learning models are to be used to analyze engineering schematics in a specific domain (such as a specific industry), the labeled engineering schematics 500 used for data augmentation can be limited to engineering schematics for that specific domain.

Figure 6:
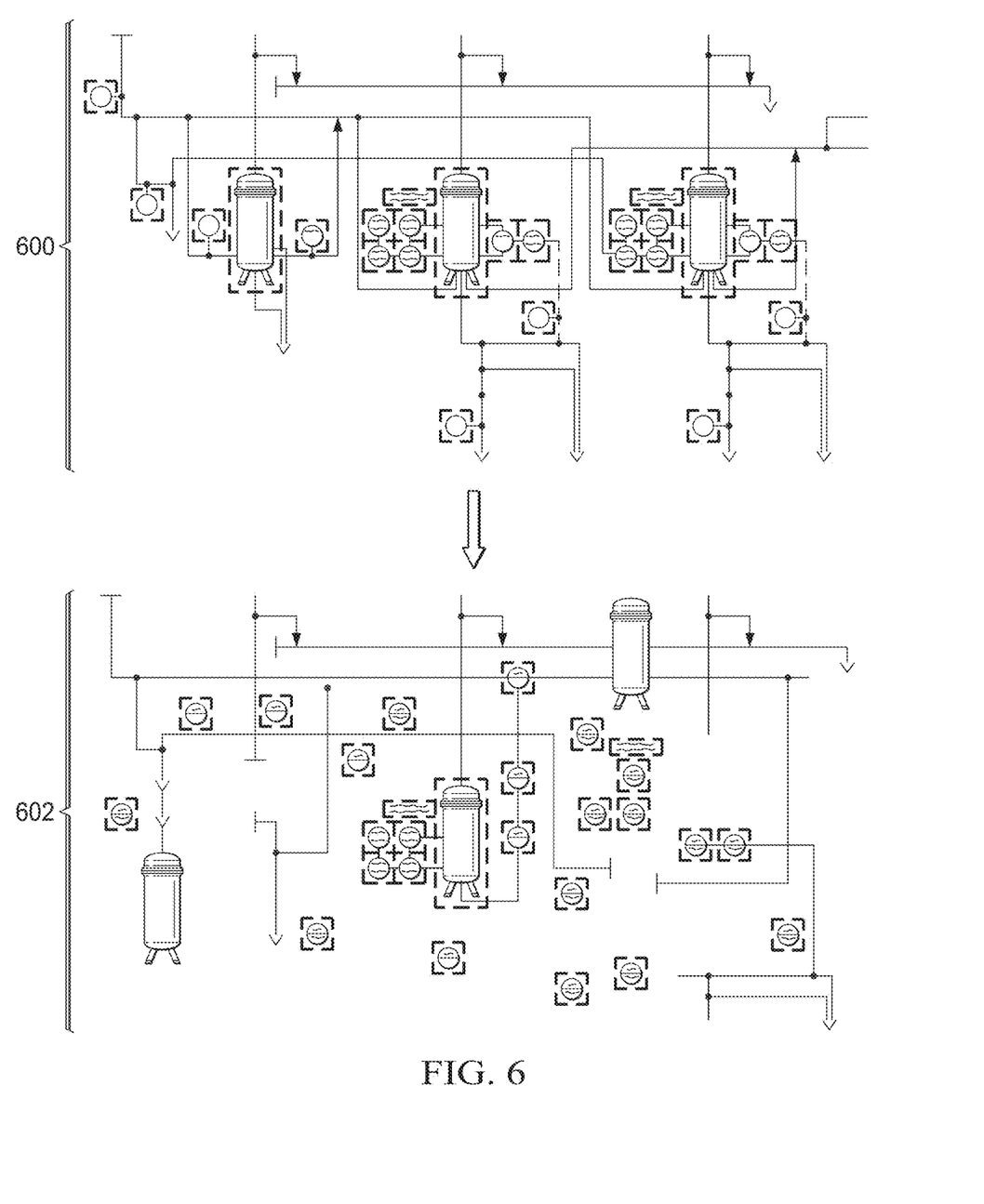
FIG. 6 illustrates a second example technique for training data augmentation according to this disclosure.

FIG. 6 illustrates a second example technique for training data augmentation according to this disclosure. This example technique involves cropping one or more symbols and randomly placing those symbols into one or more engineering diagram backgrounds to create at least one synthetic diagram. As shown in FIG. 6, for instance, a labeled engineering schematic 600 represents annotated training data, such as when the labeled engineering schematic 600 contains symbols having known boundaries 204 and known classifications 206. The second example technique for training data augmentation can crop one or more symbols from the labeled engineering schematic 600, optionally modify at least one of the cropped symbols, and insert at least one of the cropped (and possibly modified) symbols into the background of the same engineering schematic 600 and/or at least one additional engineering schematic. Example modifications may include the same types of modifications discussed above with respect to FIG. 5, such as color shifting, line thickening/thinning, dilation, and/or noise pixel additions. This can result in the creation of a new labeled engineering schematic 602. Because the new schematic 602 is generated using the contents of one or more labeled schematics, the new schematic 602 represents completely-labeled training data that can be used for machine learning model training. This is due to the new schematic 602 containing known symbols with known boundaries 204 and classifications 206.

Note that different versions of the same symbol may be produced during this augmentation process, such as by cropping the same symbol in different ways and/or applying different modification types, combinations of modification types, and/or levels of modifications to the cropped symbols. Also, any individual cropped and potentially modified symbol or any combination of cropped and potentially modified symbols may be identified and inserted into any number of engineering schematics. Further, the insertion locations of the cropped and potentially modified symbols can vary widely. As a result, it is possible to generate a very large amount of annotated training data based on a limited number of labeled engineering schematics 600. In addition, note that when one or more machine learning models are to be used to analyze engineering schematics in a specific domain (such as a specific industry), the labeled engineering schematics 600 used for data augmentation can be limited to engineering schematics for that specific domain.

This second approach for data augmentation may sometimes be said to represent a "copy and paste" data augmentation process since one or more symbols are effectively being copied from one or more engineering schematics and pasted into the same engineering schematic(s) or one or more additional engineering schematics. However, note here that overlapping of engineering symbols is typically not permitted in engineering schematics, such as due to standard practice. As a result, the pasting of a copied and potentially modified symbol into an engineering schematic is said to occur in the "background" of that schematic. This means that the symbol is pasted into the engineering schematic at a location where the pasted symbol does not overlap with another symbol.

Figure 7:
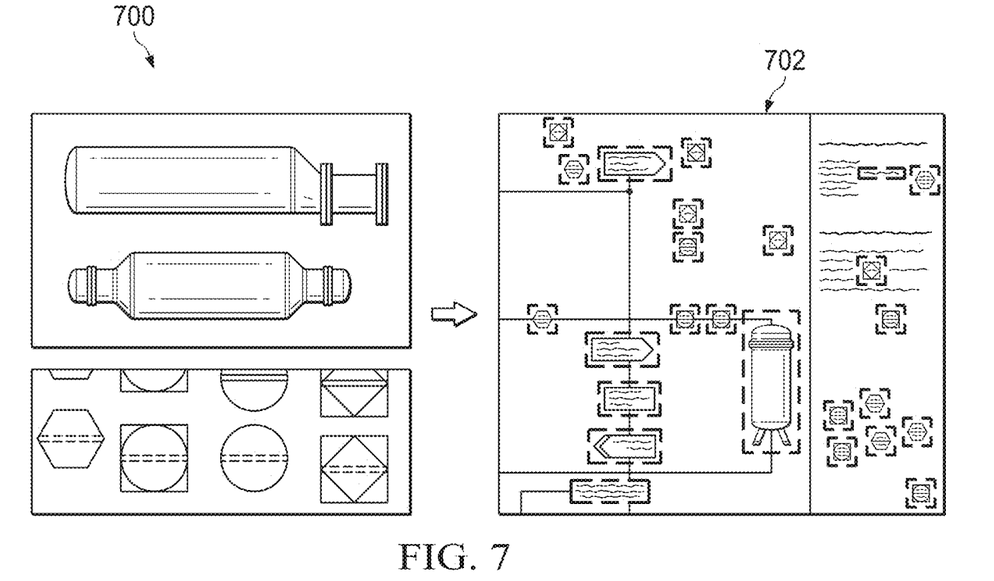
FIG. 7 illustrates a third example technique for training data augmentation according to this disclosure.

FIG. 7 illustrates a third example technique for training data augmentation according to this disclosure. This example technique involves randomly selecting and optionally adding text onto one or more symbols from at least one symbol library and randomly placing the selected symbol(s) into one or more engineering diagram backgrounds to create at least one synthetic diagram. As shown in FIG. 7, for instance, one or more libraries 700 of known symbols may be available for use, such as in an engineering diagram application that can be used by one or more users to create or edit engineering diagrams. The one or more libraries 700 may be randomly sampled in order to select one or more known symbols from the library or libraries 700. The one or more selected symbols may optionally be modified. Example modifications may include the same types of modifications discussed above in FIG. 5, such as color shifting, line thickening/thinning, dilation, and/or noise pixel additions. Additional modifications may include randomly creating text for the one or more selected symbols and/or randomly resizing the one or more selected symbols (while generally preserving each symbol's aspect ratio). Note that various limits can be placed on the random resizing of selected symbols, such as by limiting the amount of resizing so that relative size ratios of different symbols are maintained. A specific example of this may include ensuring that sensor symbols are not resized to be larger than the symbols of their associated equipment.

One or more modified versions of the selected symbol(s) from the library or libraries 700 may be inserted into at least one engineering schematic 702. Note that each modified version of a symbol from a library 700 represents annotated training data since the boundary 204 and the classification 206 of that symbol are known. In some cases, an engineering schematic 702 may represent a labeled engineering schematic with known symbols, and one or more modified versions of one or more selected symbols from the library or libraries 700 may be inserted (such as in a non-overlapping manner) into the background of the engineering schematic 702. In other cases, an engineering schematic 702 may represent a blank schematic into which multiple modified versions of multiple selected symbols from the library or libraries 700 can be inserted. Overall, this approach may be used to emulate an actual engineering drawing process in which an engineer or other user drags symbols from one or more symbol libraries, adds identifier strings to the symbols, and drops the symbols into a diagram.

Note that different versions of the same symbol from a library 700 may be produced, such as by applying different modification types, combinations of modification types, levels of modifications, text, and/or resizing to the symbol. Also, any individual selected and potentially modified symbol or any combination of selected and potentially modified symbols may be identified and inserted into any number of engineering schematics. Further, the insertion locations of the selected and potentially modified symbols can vary widely, and the specific library or libraries 700 used may vary. As a result, it is possible to generate a very large amount of annotated training data based on one or more libraries 700 of symbols. In addition, note that when one or more machine learning models are to be used to analyze engineering schematics in a specific domain (such as a specific industry), the one or more libraries 700 used for data augmentation may be limited to symbols or symbol libraries for that specific domain.

Although FIGS. 5 through 7 illustrate examples of techniques for training data augmentation, various changes may be made to FIGS. 5 through 7. For example, any other suitable engineering schematics, symbols, symbol modifications, and symbol libraries may be used to produce annotated training data for one or more machine learning models. Also, while three techniques for training data augmentation are described above, any single technique or combination of techniques may be used for training data augmentation in any particular implementation.

Figure 8:
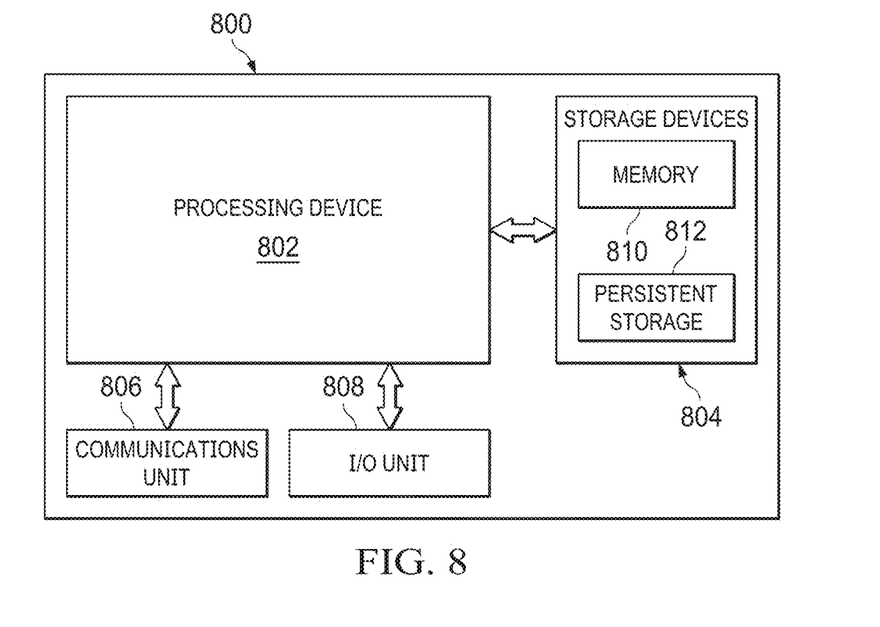
FIG. 8 illustrates an example device supporting data-efficient object detection of engineering schematic symbols and/or training data augmentation according to this disclosure.

FIG. 8 illustrates an example device 800 supporting data-efficient object detection of engineering schematic symbols and/or training data augmentation according to this disclosure. One or more instances of the device 800 may, for example, be used to implement the object detection functionality described with respect to FIGS. 1 through 4 and/or the training data augmentation functionality described with respect to FIGS. 5 through 7. However, the object detection functionality and/or the training data augmentation functionality may be implemented in any other suitable manner.

As shown in FIG. 8, the device 800 denotes a computing device or system that includes at least one processing device 802, at least one storage device 804, at least one communications unit 806, and at least one input/output (I/O) unit 808. The processing device 802 may execute instructions that can be loaded into a memory 810. The processing device 802 includes any suitable number(s) and type(s) of processors or other processing devices in any suitable arrangement. Example types of processing devices 802 include one or more microprocessors, microcontrollers, digital signal processors (DSPs), application specific integrated circuits (ASICs), field programmable gate arrays (FPGAs), or discrete circuitry.

The memory 810 and a persistent storage 812 are examples of storage devices 804, which represent any structure(s) capable of storing and facilitating retrieval of information (such as data, program code, and/or other suitable information on a temporary or permanent basis). The memory 810 may represent a random access memory or any other suitable volatile or non-volatile storage device(s). The persistent storage 812 may contain one or more components or devices supporting longer-term storage of data, such as a read only memory, hard drive, Flash memory, or optical disc.

The communications unit 806 supports communications with other systems or devices. For example, the communications unit 806 can include a network interface card or a wireless transceiver facilitating communications over a wired or wireless network. The communications unit 806 may support communications through any suitable physical or wireless communication link(s).

The I/O unit 808 allows for input and output of data. For example, the I/O unit 808 may provide a connection for user input through a keyboard, mouse, keypad, touchscreen, or other suitable input device. The I/O unit 808 may also send output to a display, printer, or other suitable output device. Note, however, that the I/O unit 808 may be omitted if the device 800 does not require local I/O, such as when the device 800 represents a server or other device that can be accessed remotely.

In some embodiments, instructions may be loaded into at least one storage device 804 and executed by at least one processing device 802 in order to perform data-efficient object detection of engineering schematic symbols. For example, the instructions when executed may cause the at least one processing device 802 to obtain an input engineering schematic 102, identify visual features (such as feature maps) of the input engineering schematic 102, and process the visual features using at least one trained machine learning model. The at least one trained machine learning model can be trained to identify boundaries 204 around potential symbols in the input engineering schematic 102 and classify the symbols in the input engineering schematic 102 into suitable classifications 206. Each classification 206 can identify the type for a symbol detected in the input engineering schematic 102, and different classifications 206 can be associated with different types of symbols. In this way, the device 800 can be used to identify the types of symbols contained in engineering schematics.

Also or alternatively, in some embodiments, instructions may be loaded into at least one storage device 804 and executed by at least one processing device 802 in order to perform training data augmentation. For example, the instructions when executed may cause the at least one processing device 802 to obtain training data that includes at least one training engineering schematic 102, such as one containing known symbols (possibly with known boundaries 204 and known classifications 206 of the symbols). The instructions when executed may also cause the at least one processing device 802 to augment the training data with at least one additional training engineering schematic 102, such as by using one or more of the approaches described above. Each additional training engineering schematic 102 may include a synthetic schematic containing at least one additional known symbol (possibly with a known boundary 204 and a known classification 206 for each additional symbol). At least one machine learning model can be trained using the training engineering schematic(s) and the additional training engineering schematic(s). In this way, the device 800 can be used to augment training data that is based on or includes engineering schematics.

Although FIG. 8 illustrates one example of a device 800 supporting data-efficient object detection of engineering schematic symbols and/or training data augmentation, various changes may be made to FIG. 8. For example, computing and communication devices and systems come in a wide variety of configurations, and FIG. 8 does not limit this disclosure to any particular computing or communication device or system.

Figure 9:
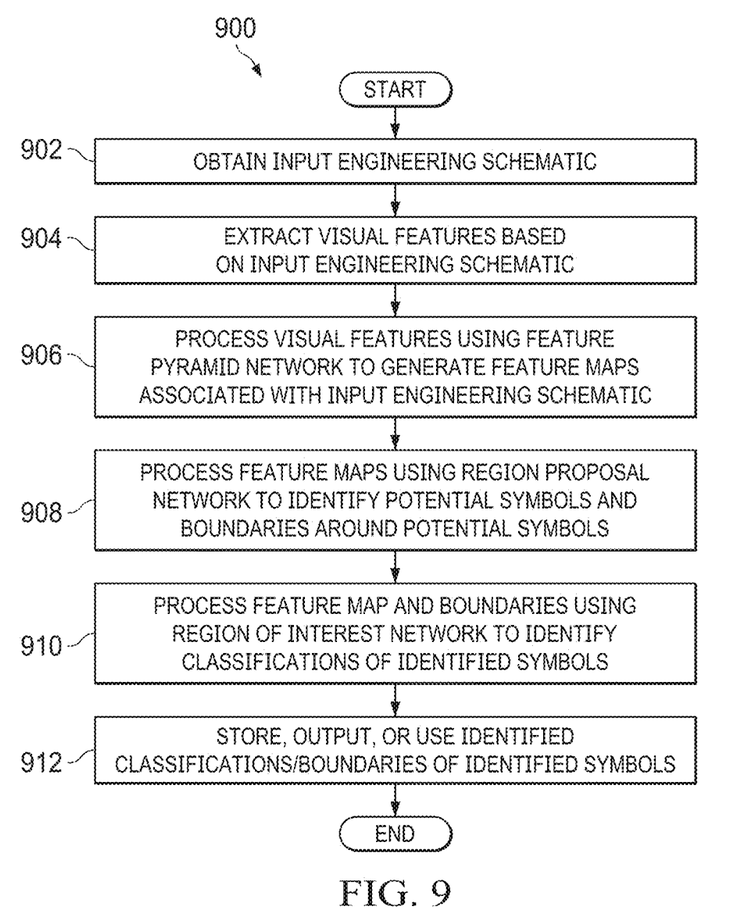
FIG. 9 illustrates an example method for data-efficient object detection of engineering schematic symbols according to this disclosure.

FIG. 9 illustrates an example method 900 for data-efficient object detection of engineering schematic symbols according to this disclosure. For ease of explanation, the method 900 may be described as being performed using the architecture 100 of FIG. 1, which may be implemented using one or more instances of the device 800. However, the method 900 may be performed using any other suitable device(s) and in any suitable system(s).

As shown in FIG. 9, an input engineering schematic is obtained at step 902. This may include, for example, the processing device 802 of the device 800 obtaining an input engineering schematic 102 from a storage device 804 or other suitable source. Visual features are extracted based on the input engineering schematic at step 904. This may include, for example, the processing device 802 of the device 800 using the feature extractor 104 to generate feature vectors or other extracted visual features associated with the input engineering schematic 102. The visual features are processed using a feature pyramid network to generate feature maps associated with the input engineering schematic at step 906. This may include, for example, the processing device 802 of the device 800 using the feature pyramid network 106 to process the feature vectors or other extracted visual features and generate feature maps 202 at different scales.

The feature maps are processed using a region proposal network to identify potential symbols and boundaries around the potential symbols at step 908. This may include, for example, the processing device 802 of the device 800 using the region proposal network 108 to identify boundaries 204 around potential symbols in the input engineering schematic 102 based on the feature maps 202. As a particular example, the region proposal network 108 may perform bounding box regression in order to identify the boundaries 204 around the potential symbols in the input engineering schematic 102. The feature maps and the identified boundaries are processed using a region of interest network to identify classifications of the identified symbols at step 910. This may include, for example, the processing device 802 of the device 800 using the region of interest network 110 to generate classifications 206 identifying the types of the symbols in the input engineering schematic 102.

The identified classifications and boundaries of the symbols in the input engineering schematic may be stored, output, or used at step 912. This may include, for example, the processing device 802 of the device 800 storing the identified symbols and their boundaries 204 and classifications 206 in a structured format, such as by generating a digital representation of the input engineering schematic 102 using the identified boundaries 204 and the identified classifications 206. This may also include the processing device 802 of the device 800 using the identified symbols and their boundaries 204 and classifications 206 to perform one or more functions related to a facility or other location containing equipment represented by the input engineering schematic 102. In general, the identified symbols and their boundaries 204 and classifications 206 may be used in any suitable manner and for any suitable purpose(s).

Although FIG. 9 illustrates one example of a method 900 for data-efficient object detection of engineering schematic symbols, various changes may be made to FIG. 9. For example, while shown as a series of steps, various steps in FIG. 9 may overlap, occur in parallel, occur in a different order, or occur any number of times.

Figure 10:
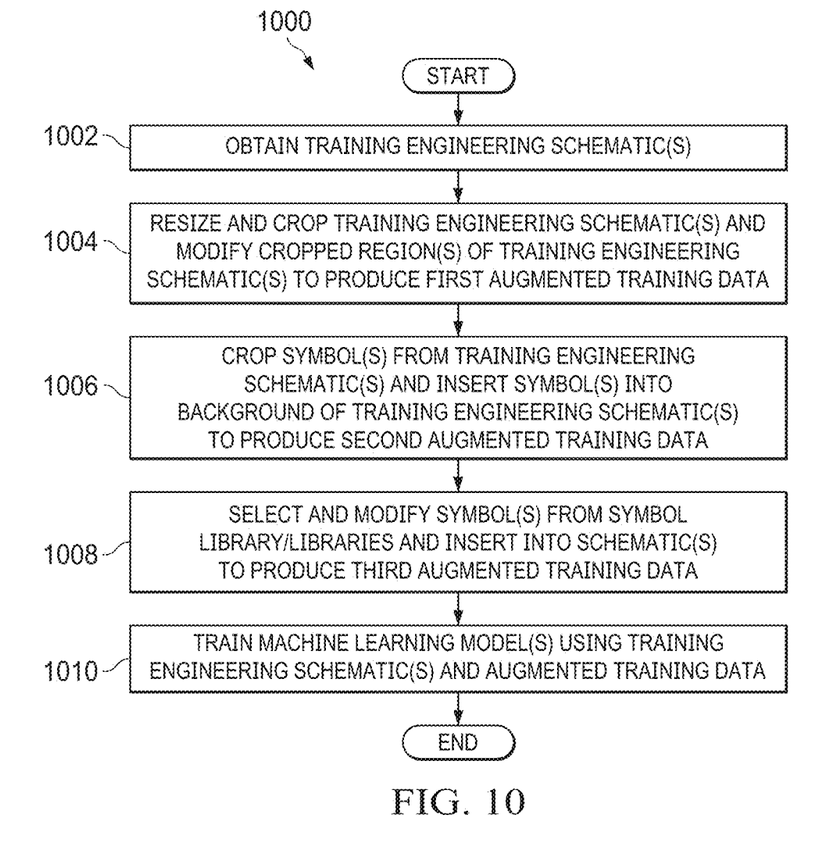
FIG. 10 illustrates an example method for training data augmentation according to this disclosure.

FIG. 10 illustrates an example method 1000 for training data augmentation according to this disclosure. For ease of explanation, the method 1000 may be described as being performed using the architecture 100 of FIG. 1, which may be implemented using one or more instances of the device 800. However, the method 1000 may be performed using any other suitable device(s) and in any suitable system(s).

As shown in FIG. 10, one or more training engineering schematics are obtained at step 1002. This may include, for example, the processing device 802 of the device 800 obtaining one or more input engineering schematics 102 from a storage device 804 or other suitable source(s). In some cases, each input engineering schematic 102 can have known symbols with known boundaries 204 and known classifications 206.

Using one technique for data augmentation, at least one training engineering schematic can be resized and cropped and one or more modifications can optionally be applied to the cropped region(s) of the training engineering schematic(s) to produce first augmented training data at step 1004. This may include, for example, the processing device 802 of the device 800 rescaling and cropping each of one or more engineering schematics 500 to produce one or more regions 502 and applying one or more modifications to the region(s) 502 in order to produce one or more new schematics 504.

Using another technique for data augmentation, one or more symbols can be cropped from at least one training engineering schematic, optionally modified, and inserted into the background of one or more training engineering schematics to produce second augmented training data at step 1006. This may include, for example, the processing device 802 of the device 800 cropping one or more symbols from one or more engineering schematics 600, optionally modifying the one or more cropped symbols, and inserting the one or more symbols into one or more engineering schematics (such as in a non-overlapping manner) in order to produce one or more new schematics 602.

Using yet another technique for data augmentation, one or more symbols can be selected from at least one symbol library, optionally modified, and inserted into the background of one or more training engineering schematics to produce third augmented training data at step 1008. This may include, for example, the processing device 802 of the device 800 selecting symbols from one or more libraries 700, optionally modifying one or more of the selected symbols, and inserting the one or more symbols into one or more engineering schematics in order to produce one or more new schematics 702.

One or more machine learning models may be trained using the one or more training engineering schematics and the augmented training data at step 1010. This may include, for example, the processing device 802 of the device 800 performing back-propagation or other training technique to modify gradients and weights of one or more machine learning models (such as one or more models implementing the region proposal network 108 and the region of interest network 110) to reduce a loss function (such as the one defined above) below a threshold value. Ideally, the one or more machine learning models can be trained to be more effective at identifying one or more characteristics of symbols in input engineering schematics 102, such as the boundaries 204 and the classifications 206 of the symbols, compared to training without the augmented training data.

Although FIG. 10 illustrates one example of a method 1000 for training data augmentation, various changes may be made to FIG. 10. For example, while shown as a series of steps, various steps in FIG. 10 may overlap, occur in parallel, occur in a different order, or occur any number of times. Also, while three training data augmentation techniques are used in FIG. 10, one or any combination of the training data augmentation techniques may be used in any given implementation.

The following describes example embodiments of this disclosure that implement data-efficient object detection of engineering schematic symbols. However, other embodiments may be used in accordance with the teachings of this disclosure.

In a first embodiment, a method includes obtaining an engineering schematic containing multiple symbols and connections involving the symbols, where different ones of the symbols in the engineering schematic represent different types of equipment. The method also includes identifying visual features of the engineering schematic. The method further includes processing the visual features using at least one trained machine learning model to (i) identify boundaries around the symbols in the engineering schematic and (ii) classify the symbols in the engineering schematic into multiple classifications, where different ones of the classifications are associated with different types of symbols.

In a second embodiment, an apparatus includes at least one processing device configured to obtain an engineering schematic containing multiple symbols and connections involving the symbols, where different ones of the symbols in the engineering schematic represent different types of equipment. The at least one processing device is also configured to identify visual features of the engineering schematic. The at least one processing device is further configured to process the visual features using at least one trained machine learning model to (i) identify boundaries around the symbols in the engineering schematic and (ii) classify the symbols in the engineering schematic into multiple classifications, where different ones of the classifications are associated with different types of symbols.

In a third embodiment, a non-transitory computer readable medium stores computer readable program code that when executed causes one or more processors to obtain an engineering schematic containing multiple symbols and connections involving the symbols, where different ones of the symbols in the engineering schematic represent different types of equipment. The medium also stores computer readable program code that when executed causes the one or more processors to identify visual features of the engineering schematic. The medium further stores computer readable program code that when executed causes the one or more processors to process the visual features using at least one trained machine learning model to (i) identify boundaries around the symbols in the engineering schematic and (ii) classify the symbols in the engineering schematic into multiple classifications, where different ones of the classifications are associated with different types of symbols.

Any single one or any suitable combination of the following features may be used with the first, second, or third embodiment. The at least one trained machine learning model may include (i) a region proposal network configured to identify the boundaries around the symbols in the engineering schematic based on the visual features and (ii) a region of interest network configured to classify the symbols in the engineering schematic into the multiple classifications based on the visual features and the identified boundaries. The visual features of the engineering schematic may be identified using a feature extractor, and a feature pyramid network may generate feature maps at different scales based on the visual features. The at least one trained machine learning model may include multiple machine learning pathways, and different ones of the machine learning pathways may be trained to identify boundaries around the different types of symbols. The at least one trained machine learning model may be trained by modifying gradients or weights in one or more of the machine learning pathways using training data associated with one or more of the different types of symbols without modifying gradients or weights in one or more others of the machine learning pathways that are associated with one or more others of the different types of symbols. The different ones of the machine learning pathways may be trained to identify boundaries around symbols having different shapes and/or different aspect ratios. A digital representation of the engineering schematic may be generated using the identified boundaries around the symbols in the engineering schematic and the classifications of the symbols in the engineering schematic.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrases "at least one of" and "one or more of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   obtaining an engineering schematic containing multiple symbols and connections involving the symbols, wherein different ones of the symbols in the engineering schematic represent different types of equipment;
   identifying visual features of the engineering schematic; and
   processing the visual features using at least one trained machine learning model to (i) identify boundaries around the symbols in the engineering schematic and (ii) classify the symbols in the engineering schematic into multiple classifications, wherein different ones of the classifications are associated with different types of symbols.

2. The method of claim 1, wherein the at least one trained machine learning model comprises:
   a region proposal network configured to identify the boundaries around the symbols in the engineering schematic based on the visual features; and
   a region of interest network configured to classify the symbols in the engineering schematic into the multiple classifications based on the visual features and the identified boundaries.

3. The method of claim 1, wherein:
   identifying the visual features of the engineering schematic comprises using a feature extractor; and
   the method further comprises using a feature pyramid network to generate feature maps at different scales based on the visual features.

4. The method of claim 1, wherein the at least one trained machine learning model comprises multiple machine learning pathways, different ones of the machine learning pathways trained to identify boundaries around the different types of symbols.

5. The method of claim 4, wherein the at least one trained machine learning model is trained by modifying gradients or weights in one or more of the machine learning pathways using training data associated with one or more of the different types of symbols without modifying gradients or weights in one or more others of the machine learning pathways that are associated with one or more others of the different types of symbols.

6. The method of claim 4, wherein the different ones of the machine learning pathways are trained to identify boundaries around symbols having at least one of: different shapes and different aspect ratios.

7. The method of claim 1, further comprising:
   generating a digital representation of the engineering schematic using the identified boundaries around the symbols in the engineering schematic and the classifications of the symbols in the engineering schematic.

8. An apparatus comprising:
   at least one processing device configured to:
      obtain an engineering schematic containing multiple symbols and connections involving the symbols, wherein different ones of the symbols in the engineering schematic represent different types of equipment;
      identify visual features of the engineering schematic; and
      process the visual features using at least one trained machine learning model to (i) identify boundaries around the symbols in the engineering schematic and (ii) classify the symbols in the engineering schematic into multiple classifications, wherein different ones of the classifications are associated with different types of symbols.

9. The apparatus of claim 8, wherein the at least one trained machine learning model comprises:
   a region proposal network configured to identify the boundaries around the symbols in the engineering schematic based on the visual features; and
   a region of interest network configured to classify the symbols in the engineering schematic into the multiple classifications based on the visual features and the identified boundaries.

10. The apparatus of claim 8, wherein:
    to identify the visual features of the engineering schematic, the at least one processing device is configured to use a feature extractor; and
    the at least one processing device is further configured to use a feature pyramid network to generate feature maps at different scales based on the visual features.

11. The apparatus of claim 8, wherein the at least one trained machine learning model comprises multiple machine learning pathways, different ones of the machine learning pathways trained to identify boundaries around the different types of symbols.

12. The apparatus of claim 11, wherein the at least one trained machine learning model is trained by modifying gradients or weights in one or more of the machine learning pathways using training data associated with one or more of the different types of symbols without modifying gradients or weights in one or more others of the machine learning pathways that are associated with one or more others of the different types of symbols.

13. The apparatus of claim 11, wherein the different ones of the machine learning pathways are trained to identify boundaries around symbols having at least one of: different shapes and different aspect ratios.

14. The apparatus of claim 8, wherein the at least one processing device is further configured to generate a digital representation of the engineering schematic using the identified boundaries around the symbols in the engineering schematic and the classifications of the symbols in the engineering schematic.

15. A non-transitory computer readable medium storing computer readable program code that when executed causes one or more processors to:

obtain an engineering schematic containing multiple symbols and connections involving the symbols, wherein different ones of the symbols in the engineering schematic represent different types of equipment;

identify visual features of the engineering schematic; and process the visual features using at least one trained machine learning model to (i) identify boundaries around the symbols in the engineering schematic and (ii) classify the symbols in the engineering schematic into multiple classifications, wherein different ones of the classifications are associated with different types of symbols.

16. The non-transitory computer readable medium of claim 15, wherein the at least one trained machine learning model comprises:

a region proposal network configured to identify the boundaries around the symbols in the engineering schematic based on the visual features; and a region of interest network configured to classify the symbols in the engineering schematic into the multiple classifications based on the visual features and the identified boundaries.

17. The non-transitory computer readable medium of claim 15, wherein:

the computer readable program code that when executed causes the one or more processors to identify the visual features of the engineering schematic comprises:

computer readable program code that when executed causes the one or more processors to use a feature extractor; and the medium further stores computer readable program code that when executed causes the one or more processors to use a feature pyramid network to generate feature maps at different scales based on the visual features.

18. The non-transitory computer readable medium of claim 15, wherein the at least one trained machine learning model comprises multiple machine learning pathways, different ones of the machine learning pathways trained to identify boundaries around the different types of symbols.

19. The non-transitory computer readable medium of claim 18, wherein the at least one trained machine learning model is trained by modifying gradients or weights in one or more of the machine learning pathways using training data associated with one or more of the different types of symbols without modifying gradients or weights in one or more others of the machine learning pathways that are associated with one or more others of the different types of symbols.

20. The non-transitory computer readable medium of claim 18, wherein the different ones of the machine learning pathways are trained to identify boundaries around symbols having at least one of: different shapes and different aspect ratios.

21. The non-transitory computer readable medium of claim 15, wherein the medium further stores computer readable program code that when executed causes the one or more processors to:

generate a digital representation of the engineering schematic using the identified boundaries around the symbols in the engineering schematic and the classifications of the symbols in the engineering schematic.

* * * * *